No. 791,116. PATENTED MAY 30, 1905.
J. B. TAYLOR.
CONTROL OF SYNCHRONOUS MACHINES.
APPLICATION FILED OCT. 17, 1904.
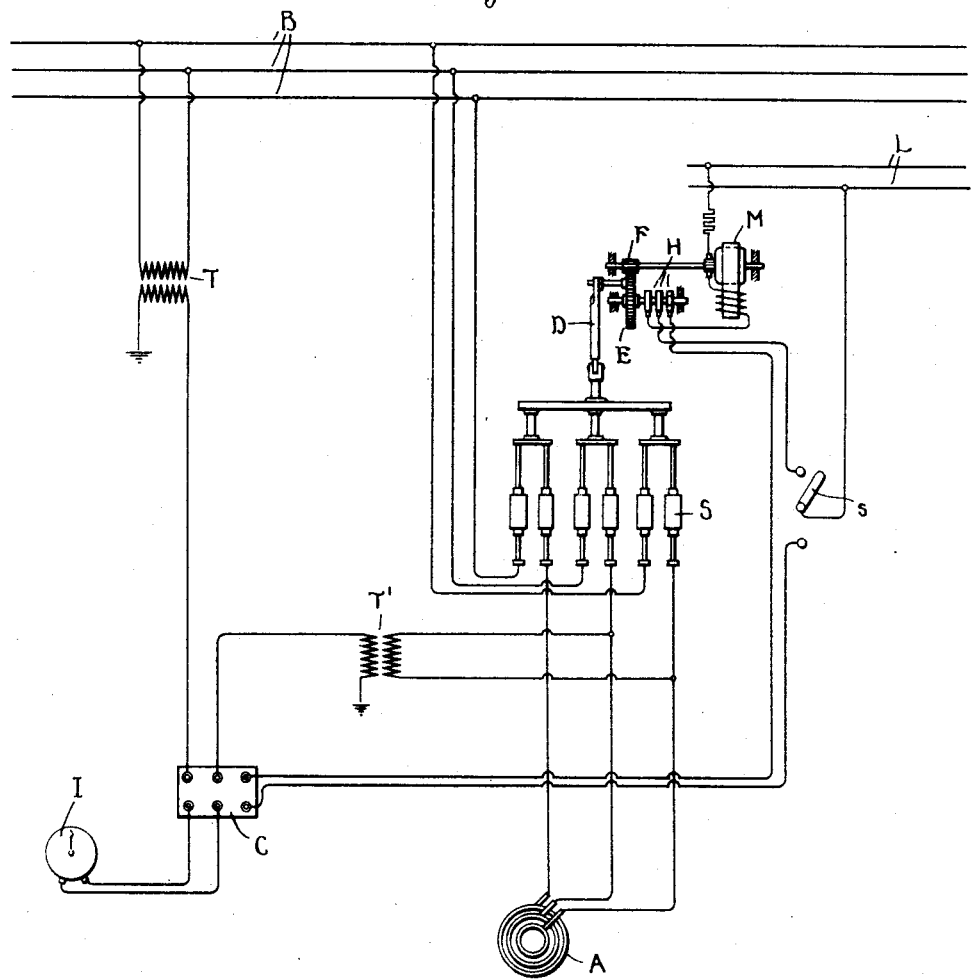
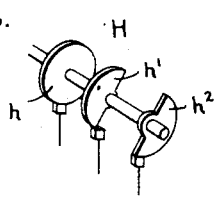
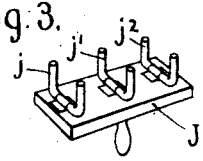
Witnesses.
Inventor.
John B. Taylor.
by
Atty.

No. 791,116.

Patented May 30, 1905.

UNITED STATES PATENT OFFICE.

JOHN B. TAYLOR, OF SCHENECTADY, NEW YORK, ASSIGNOR TO GENERAL ELECTRIC COMPANY, A CORPORATION OF NEW YORK.

CONTROL OF SYNCHRONOUS MACHINES.

SPECIFICATION forming part of Letters Patent No. 791,116, dated May 30, 1905.

Application filed October 17, 1904. Serial No. 228,685.

*To all whom it may concern:*

Be it known that I, JOHN B. TAYLOR, a citizen of the United States, residing at Schenectady, county of Schenectady, State of New York, have invented certain new and useful Improvements in Control of Synchronous Machines, of which the following is a specification.

My invention relates to the control of alternating-current generators which are operated in parallel or of synchronous motors, and refers particularly to the control of electrically-operated switches in the generator or motor circuit. When an incoming machine is connected to the bus-bars, it is important that it should be brought to exact synchronism before closing the switches, since otherwise a rush of current will ensue which may temporarily lower the bus-bar voltage or possibly result in damage to the generator. Consequently it is customary to provide synchronism-indicating devices, so that the generator may be brought to exact synchronism before closing the switches. Even when such devices are provided, however, it sometimes happens that a careless attendant may forgetfully or wilfully neglect to insert the usual synchronizing-plug for connecting the synchronism-indicator in circuit and close the generator-switch, trusting to his own judgment or to chance that the generator is in synchronism.

By my invention it becomes impossible to connect the generator to the bus-bars without first inserting the sychronizing-plug.

My invention consists in providing the usual synchronizing-plug with an extra contact and arranging the control-circuits to include said contact, so that the electric operating means for closing the generator-switch cannot be energized until the synchronizing-plug is in place.

My invention will be best understood by reference to the accompanying drawings, in which—

Figure 1 shows diagrammatically a generator and electrically-operated controlling-switch therefor provided with controlling-circuits arranged in accordance with my invention. Fig. 2 shows a detail of the automatic motor-controlling switch, and Fig. 3 shows a perspective view of the synchronizing-plug.

In Fig. 1, A represents an alternating-current generator or synchronous motor which is arranged for connection to the bus-bars B through the switch S. The switch S is operated by an electric motor M or other electro-responsive device. The specific connection between the switch and motor which I have shown consists of a crank D, connected to a gear-wheel E, which is engaged by a pinion F on the shaft of the motor M. With this arrangement the rotation of the motor may be employed to open and close the switch S.

H represents an automatic switch on the shaft of the gear $e$, by means of which the circuit of the motor is opened when the switch S reaches its closed or open position. The switch H may be arranged as shown in detail in Fig. 2. It consists of a conducting-ring $h$, connected to the motor, and two conducting-segments or half-rings $h'$ $h^2$, both connected to ring $h$ and connected, respectively, to the upper and lower stationary contacts of the controlling-switch $s$, by means of which the motor may be connected to the source of current L for the control-circuit.

It will be understood that the specific connections between the motor and switch and the specific arrangement of the automatic device H form no part of my invention and may be modified as desired.

T and T' represent synchronizing-transformers connected, respectively, to the bus-bars B and to the armature-terminals of the generator A. The secondaries of these transformers are connected, through the switch-contacts C, to the synchronism-indicator I. This indicator may be of any well-known type. It will be seen that two of the switch-contacts C are inserted in the connection between the automatic switch H and the lower stationary contact of switch $s$. It is this lower stationary contact which is employed in energizing the motor M to close the switch S. Consequently unless a connection is established between the two right-hand contacts C the switch S cannot be closed.

The construction of the synchronizing-plug J, adapted to bridge the contacts C, is shown in Fig. 3, and consists of three bridging members $j$, $j'$, and $j^2$. The members $j$ and $j'$ are the contacts usually carried by the synchronizing-plug, while the contact $j^2$ is an extra contact for the purpose of closing the circuit between the lower contact of switch $s$ and the automatic switch H. It is evident that with this arrangement the synchronism-indicator must be connected in circuit before the generator A can be connected to the bus-bars.

I do not desire to limit myself to the particular construction and arrangement of parts here shown, but aim in the appended claims to cover all modifications which are within the scope of my invention.

What I claim as new, and desire to secure by Letters Patent of the United States, is—

1. In combination with an electric circuit, an alternating-current dynamo-electric machine, a switch adapted to connect said machine to said circuit, electroresponsive operating means for said switch, a control-circuit for said operating means, a synchronism-indicator, and a switch member adapted to close simultaneously the circuit of said indicator and said control-circuit.

2. In combination with an electric circuit, an alternating-current dynamo-electric machine, a switch adapted to connect said machine to said circuit, electroresponsive operating means for said switch, a control-circuit for said operating means, a synchronism-indicator, and a switch member controlling the circuit of said indicator and comprising a contact included in said control-circuit.

3. In combination with an electric circuit, an alternating-current dynamo-electric machine, a switch adapted to connect said machine to said circuit, electroresponsive operating means for said switch, a control-circuit for said operating means, a synchronism-indicator, and a synchronizing-plug comprising three contacts, two adapted to close the circuit of said indicator, and the third included in said control-circuit.

In witness whereof I have hereunto set my hand this 15th day of October, 1904.

JOHN B. TAYLOR.

Witnesses:
 HELEN ORFORD,
 G. C. HOLLISTER.